United States Patent [19]
Igarashi

[11] Patent Number: 5,991,526
[45] Date of Patent: Nov. 23, 1999

[54] METHOD FOR AUTOMATIC OPTIMIZATION OF FINITE DIFFERENCE GRIDS IN SIMULATOR

[75] Inventor: Kazuhiro Igarashi, Tokyo, Japan

[73] Assignee: NEC Corporation, Tokyo, Japan

[21] Appl. No.: 08/965,525

[22] Filed: Nov. 6, 1997

[30] Foreign Application Priority Data

Nov. 20, 1996 [JP] Japan .................................. 8-324628

[51] Int. Cl.$^6$ .................................................. G06F 9/455
[52] U.S. Cl. ............................... 395/500.23; 395/500.3; 395/102
[58] Field of Search .............................. 364/578, 148.01, 364/149, 150, 151; 702/100; 395/500.23, 500.3, 101, 102, 103, 104, 105

[56] References Cited

U.S. PATENT DOCUMENTS

| 5,740,342 | 4/1998 | Kocberber | ............................... 395/120 |
| 5,801,969 | 9/1998 | Nagahama | ............................... 364/578 |

FOREIGN PATENT DOCUMENTS

| 6-221956 | 8/1994 | Japan . |
| 7-63643 | 3/1995 | Japan . |

OTHER PUBLICATIONS

"An Object Oriented Approach to Boundary Conditions in Finite Difference Fluid Dynamics Codes", by I. Angus, IEEE Proceedings of the Scalable High Performance Computing Conference, 1992, pp.145–148.

"Automatic Generation of Finite Difference Meshes by an Evolutionary Algorithm", by M. Witting and S. Burkhardt, IEEE Transactions on Magnetics, vol. 32, No. 3, May 1996, pp. 1338–1340.

Nakahashi et al. "Three Dimensional Adaptive Grid Method" *AIAA Journal* 24:948–954.

*Primary Examiner*—Kevin J. Teska
*Assistant Examiner*—Russell W. Frejd
*Attorney, Agent, or Firm*—Foley & Lardner

[57] ABSTRACT

Before the execution of simulation, variation rates at the grid points of functions for the calculation of intersections between grid points and the surface of the shape to be analyzed of a simulation model are calculated; new grid spacings are calculated by performing calculation so that the greater the variation rate the narrower the grid spacing; and where, with respect to these grid spacings, aspect ratios far deviate from 1, finite difference grids are automatically optimized by adjusting the grid spacings so that the aspect ratios approach 1. Furthermore, during the execution of simulation, the variation rates of functions, whose values are physical quantities at different grid points, are calculated, and finite difference grids are automatically optimized by performing calculation so that the greater the the variation rate the narrower the grid spacing.

8 Claims, 9 Drawing Sheets

100 OBSTACLE

METHOD FOR AUTOMATIC OPTIMIZATION OF FINITE DIFFERENCE GRIDS IN SIMULATOR

BACKGROUND OF THE INVENTION

1. Field of the Invention

The present invention relates to a method for automatic optimization of finite difference grids for use in a simulator to perform simulation for computational fluid dynamic analysis (hereinafter referred to as "CFD simulator") or the like, whereby the spacings of analytic grids, generated by a finite difference method in the Cartesian coordinate system, are automatically adjusted, before the execution of simulation, according to the shape to be analyzed of the simulation model and, at the same time, the spacings are also automatically adjusted during the simulation according to the rates of variation of physical quantities, and a computer-readable medium in which a program for such automatic optimization is recorded.

2. Description of the Prior Art

When the spacings of analytic grids generated by a finite difference method (hereinafter referred to as "finite difference grids") in a CFD simulator or the like are to be optimized, optimization by a solution adaptive grid method, as described in the "AIAA Journal", Vol. 24, pp. 948–954, has been studied for use in the boundary fitted coordinate system that has coordinate axes along the boundary of an obstacle, but such a method involves a problem that its effective use requires the user to be experienced in parameter setting for optimization and to go through trials and errors, and another problem that it lacks versatility because it has been used for such a specific purpose as capturing shock waves.

There also are other methods including one of supplementation with a preset number of grids for use in the so-called Cartesian coordinate system, wherein coordinate axes orthogonally cross each other, such as the method disclosed in the Japanese Patent Application Laid-open No. Hei-6-221956 and another which requires the calculation of complex load coefficients for optimization, such as the one disclosed in the Japanese Patent Application Laid-open No. Hei-7-63643.

However, all these methods for use in the Cartesian coordinate system are to optimize grid spacings during simulation but not to optimize the spacings of initial grids. Therefore, where initial grids are to be set in the Cartesian coordinate system, the flow should be empirically predicted and, where the initial grids that are set would influence the result of simulation, simulation has to be repeated on a trial and error basis. Therefore, there is the problem that, depending on how the initial grids are set, the quantity of calculations or optimization rather increases instead of decreasing.

An object of the present invention, intended to obviate these problems of the prior art, is to provide a method for automatic optimization of finite difference grids, which can make it possible to obtain solutions at a higher level of accuracy than any conventional method can from an early stage of simulation, to dispense with the setting of specific parameters such as in a solution adaptive grid process, and to shorten the time required for calculation for optimization by optimizing the spacings of analytic grids in the generation of initial grids.

Another object of the invention is to provide a method for automatic optimization of finite difference grids, which makes it possible to eliminate regeneration of grids and repetition of simulation, and to reduce the loads of man-hours and cost by using automatically optimized initial grids.

Still another object of the invention is to provide a method for automatic optimization of finite difference grids, which makes it possible to provide solutions at an even higher level of accuracy of automatically adjusting the spacings of grids during simulation as well.

The present invention also has an object to provide a computer-readable medium in which is recorded an automatic optimization program for causing a computer to execute said automatic optimization of finite difference grids.

SUMMARY OF THE INVENTION

A method for automatic optimization of finite difference grids according to a first aspect of the invention for use in a CFD simulator for a simulation model based on a Cartesian coordinate system comprises the steps of:

calculating, for each grid point, the variation rate of a first prescribed function at the x coordinate value thereof and the variation rate of a second prescribed function at the y coordinate value thereof; and calculating new grid spacings by using said calculated variation rate of said first prescribed function for grid spacings in the direction of the x axis at each grid point and by using said calculated variation rate of said second prescribed function for grid spacings in the direction of the y axis at each grid point in such a manner that the greater the variation rate the narrower the grid spacing.

A method for automatic optimization of finite difference grids according to a second aspect of the invention comprises the steps of:

setting, as said first prescribed function, a first function whose value is the y coordinate value of the intersection between a grid line, parallel to the y axis, passing said grid point and the surface of the shape to be analyzed of the simulation model, setting, as said second prescribed function, a second function whose value is the x coordinate value of the intersection between a grid line, parallel to the x axis, passing said grid point and the surface of the shape to be analyzed of the simulation model; and calculating new grid spacings before the execution of simulation by using the variation rates of said first and second functions.

In a method for automatic optimization of finite difference grids according to a third aspect of the invention, the method for automatic optimization of finite difference grids according to the second aspect of the invention further comprises the steps of:

calculating an aspect ratio with respect to each of the grid spacings calculated by using the variation rates of said first and second functions, and calculating new grid spacings, where said calculated aspect ratios far deviate from 1, by dividing the grid spacings in the direction of the x axis or the y axis by a prescribed integer so that the aspect ratios approach 1.

A method for automatic optimization of finite difference grids according to a fourth aspect of the invention comprises the steps of:

setting, as said first prescribed function, a third function whose value is the component of the physical quantity in the direction of the x axis at each of said grid points and, as said second prescribed function, a fourth function whose value is the component of the physical quantity in the direction of the y axis at each of said grid points, and calculating new grid spacings during simulation by using the variation rates of said third and fourth functions.

A computer-readable recording medium according to a first aspect of the invention comprises:

a computer-readable data storage device, and a program on said device for automatic optimization of finite difference grids for use in a CFD simulator for a simulation model based on a Cartesian coordinate system, said program causing a computer:

to calculate, for each grid point, the variation rate of a first prescribed function at the x coordinate value thereof and the variation rate of a second prescribed function at the y coordinate value thereof; and to calculate new grid spacings by using said calculated variation rate of said first prescribed function for grid spacings in the direction of the x axis at each grid point and by using said calculated variation rate of said second prescribed function for grid spacings in the direction of the y axis at each grid point in such a manner that the greater the variation rate the narrower the grid spacing.

A computer-readable recording medium according to a second aspect of the invention as described above, wherein said program causes a computer;

to set, as said first prescribed function, a first function whose value is the y coordinate value of the intersection between a grid line, parallel to the y axis, passing said grid point and the surface of the shape to be analyzed of the simulation model;

to set, as said second prescribed function, a second function whose value is the x coordinate value of the intersection between a grid line, parallel to the x axis, passing said grid point and the surface of the shape to be analyzed of the simulation model; and to calculate new grid spacings before the execution or simulation by using the variation rates of said first and second functions.

A computer-readable recording medium according to a third aspect of the invention wherein said program in the above-described computer-readable recording medium further causes the computer;

to calculate an aspect ratio with respect to each of the grid spacings calculated by using the variation rates of said first and second functions, and to calculate new grid spacings, where said calculated aspect ratios far deviate from 1, by dividing the grid spacings in the direction of the x axis or the y axis by a prescribed integer so that the aspect ratios approach 1.

A computer-readable recording medium according to a fourth aspect of the invention wherein said program causes the computer:

to set, as said first prescribed function, a third function whose value is the component of the physical quantity in the direction of the x axis at each of said grid points and, as said second prescribed function, a fourth function whose value is the component of the physical quantity in the direction of the y axis at each of said grid points, and to calculate new grid spacings during simulation by using the variation rates of said third and fourth functions.

DETAILED DESCRIPTION OF THE PREFERRED EMBODIMENTS

Figure 1:
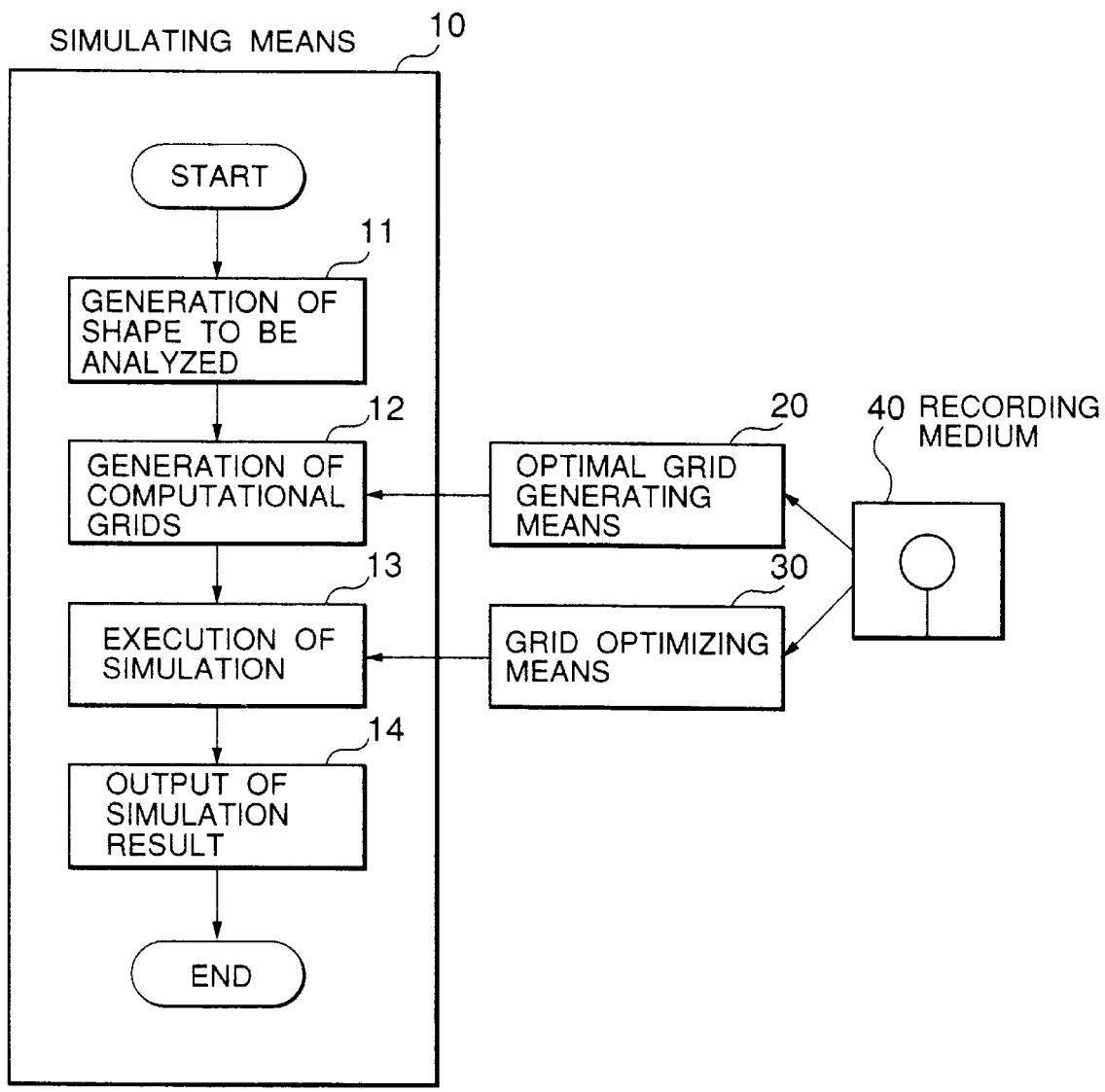
FIG. 1 is a block diagram illustrating the configuration of a preferred embodiment of the present invention.

FIG. 1 is a block diagram illustrating the configuration of a preferred embodiment of the present invention.

The embodiment of the invention includes simulating means 10, optimal grid generating means 20 and grid optimizing means 30.

The functions of the simulating means 10, as illustrated, include a processing step 11 to generate the shape to be analyzed of a simulation model;

a processing step 12 to generate analytic grids;

a processing step 13 to execute simulated analysis; and a processing step 14 to supply the result of analysis to a display screen or the like to confirm the result of analysis.

According to the invention, while optimal grids are generated at the processing step 12 before the execution of simulation under the control of the optimal grid generating means 20 according to the shape of the simulation model generated at the processing step 11, the grids are optimized under the control of the grid optimizing means 30 at the processing step 13 to execute simulation.

The processing flows in the optimal grid generating means 20 and the grid optimizing means 30 are based on the same principle, each including preliminary processing to calculate parameters for re-disposing the grid points from the inclination of the surface of the shape to be simulated or the variation rates of physical quantities; calculation processing to newly calculate grid points from the calculated parameters; and re-calculation processing to adjust the grid points according to the relative magnitudes of aspect ratios.

Every one of these processings is based on a relatively simple formulation, but none requires the setting of any special parameters.

Figure 2:
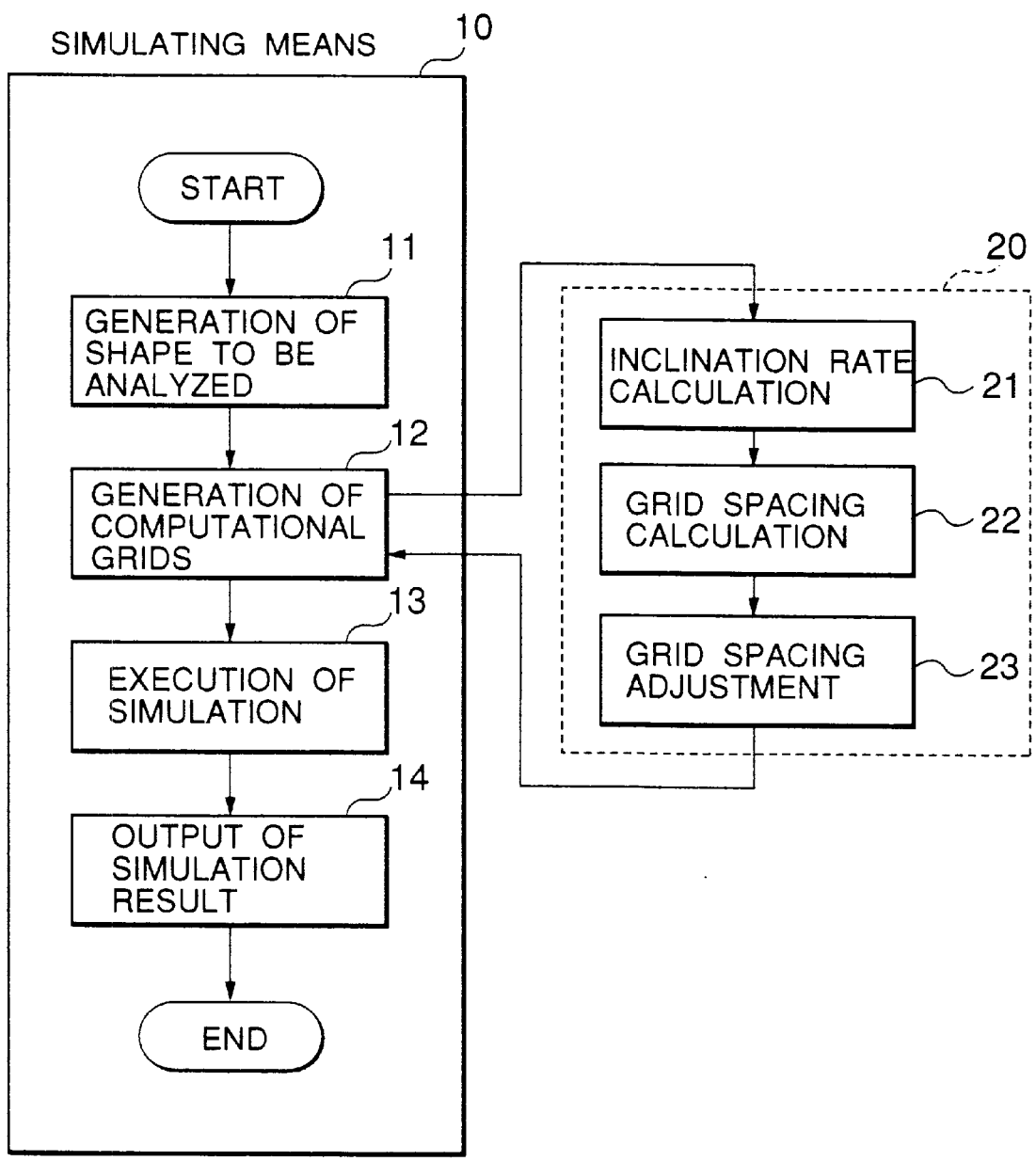
FIG. 2 is a diagram illustrating the contents of processing by optimal grid generating means 20 in the preferred embodiment of the invention.

More specifically, as illustrated in FIG. 2, the functions of the optimal grid generating means 20 include an inclination rate calculation step 21 to calculate, after generating initial grids, the inclination rates of the surface of an obstacle to be simulated; a grid spacing calculation step 22 to calculate new grid spacings; and a grid spacing adjustment step 23 to adjust grid spacings according to aspect ratios.

Figure 3:
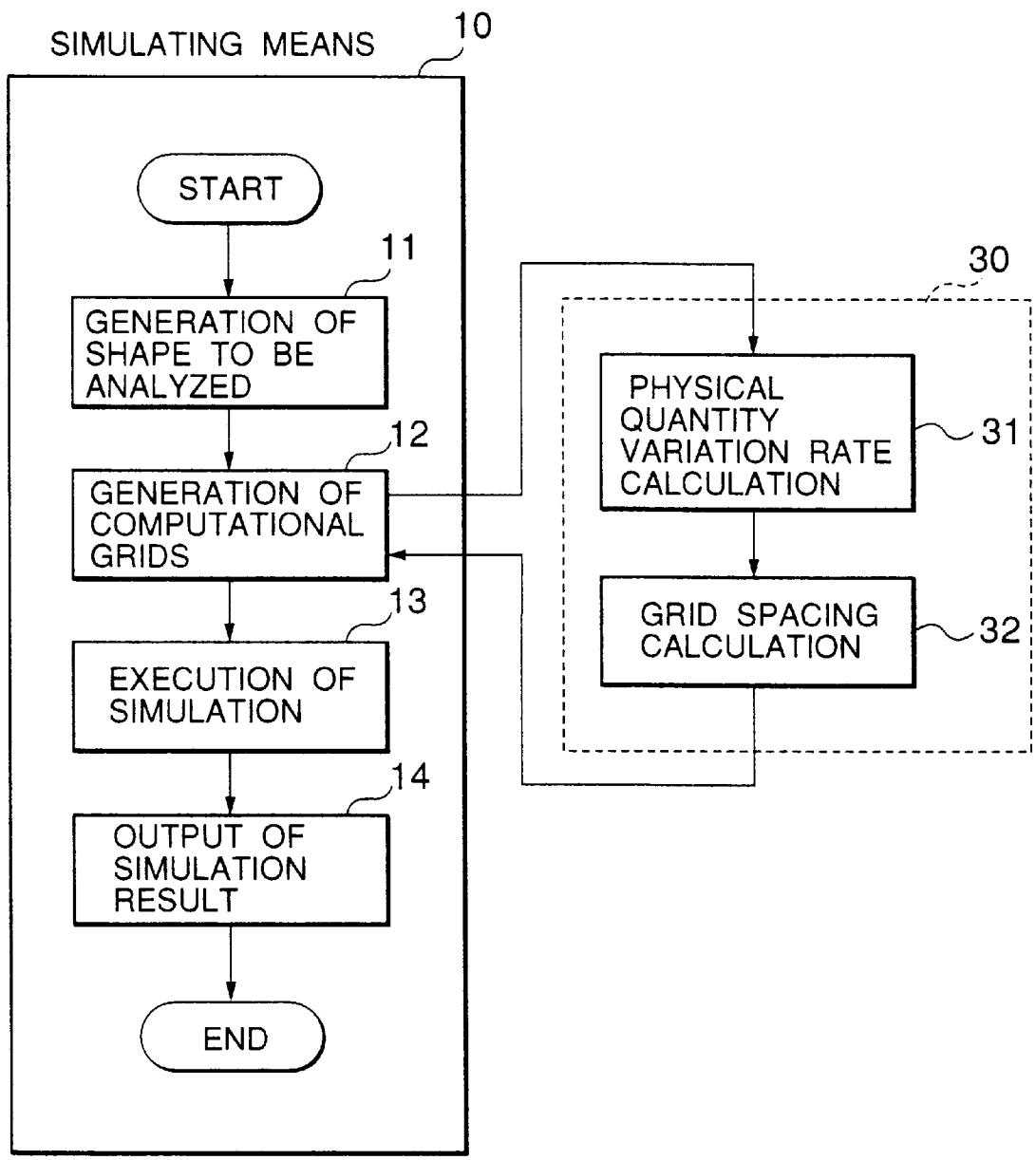
FIG. 3 is a diagram illustrating the contents of processing by grid optimizing means 30 in the embodiment of the invention.

The functions of the grid optimizing means 30, as shown in FIG. 3, include a physical quantity variation rate calculation step 31 for calculating the spatial variation rates of physical quantities, and a grid spacing calculation step 32 to calculate new grid spacings.

Figure 4:
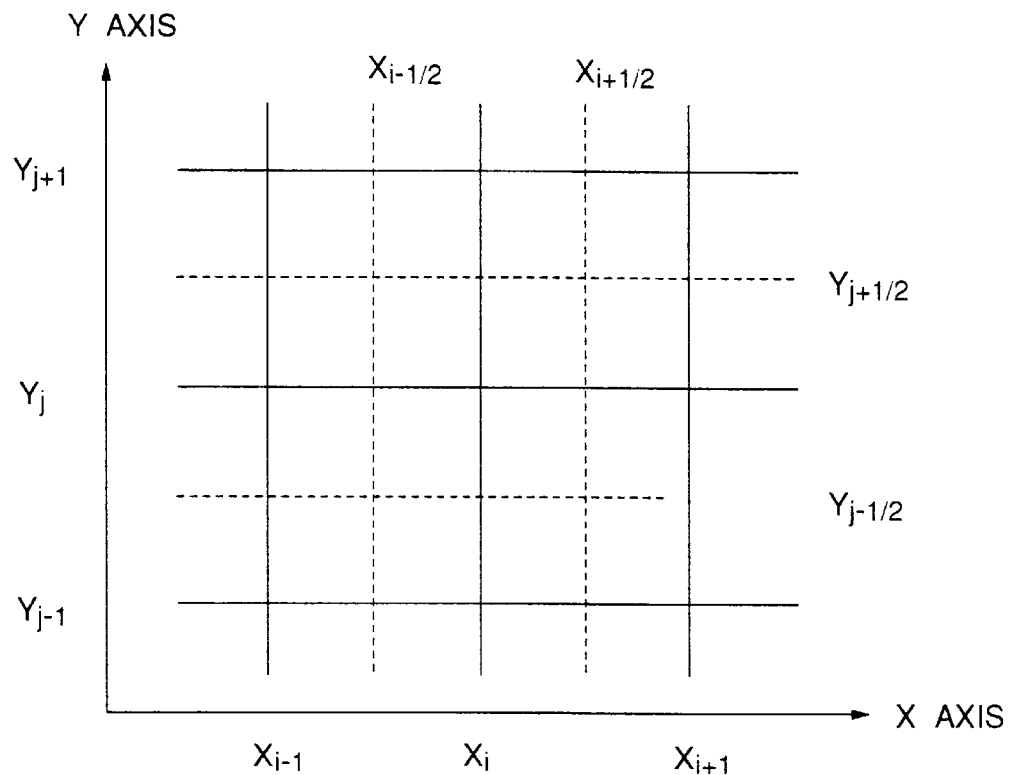
FIG. 4 is a diagram illustrating an example of initial grid in a two-dimensional coordinate system for describing processing by the embodiment of the invention.
Figure 5:
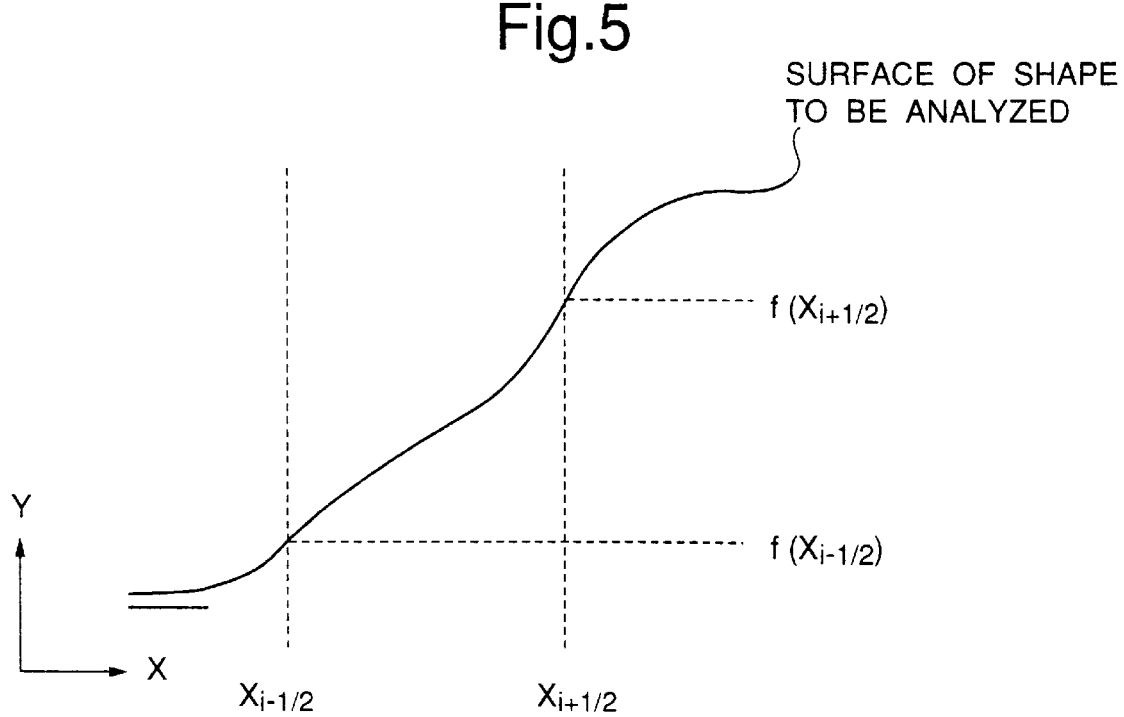
FIG. 5 is a diagram illustrating an example of the surface of shape to be analyzed of a simulation model that is to be set for describing processing by the embodiment of the invention.

The processing flows of the optimal grid generating means 20 and of the grid optimizing means 30 will be described below with respect to an example in which the surface of the shape to be analyzed of a simulation model shown in FIG. 5 is present in a two-dimensional coordinate system represented by x and y coordinates as illustrated in FIG. 4.

The inclination rate calculation step 21 of the optimal grid generating means 20 and the physical quantity variation rate calculation step 31 of the grid optimizing means 30 involve the following procedures.

First the inclination rates or the physical quantity variation rates of the surface of the shape to be analyzed of the simulation model are calculated by the following set of Equations 1.
Equations 1

$$a_i = \{f(x_{i+1/2}) - f(x_{i-1/2})\} / (x_{i+1/2} - x_{i-1/2})$$

$$x_{i+1/2} = (x_{i+1} + x_i)/2$$

$$x_{i-1/2} = (x_i + x_{i-1})/2$$

$$b_j = \{g(y_{j+1/2}) - g(y_{j-1/2})\} / (y_{j+1/2} - y_{j-1/2})$$

$$y_{j+1/2} = (y_{j+1} + y_j)/2$$

$$y_{j-1/2} = (y_j + y_{j-1})/2$$

Here, x's and y's with subscripts denote the x coordinate values and the y coordinate values at the respective grid points, and the values of f and g vary with the processing step of the optimal grid generating means 20 or the grid optimizing means 30.

Thus, in the processing by the optimal grid generating means 20, f(X) denotes the y coordinate of the intersection between a grid line x=X parallel to the y axis of initial grids and the surface of the shape to be simulated, and g(Y), that between a grid line y=Y parallel to the x axis of the initial grids and the shape surface.

Meanwhile, in the processing by the grid optimizing means 30, both f and g are the values of physical quantities at the grid center, though they may vary with the position of definition and the type of the physical quantity.

Figure 6:
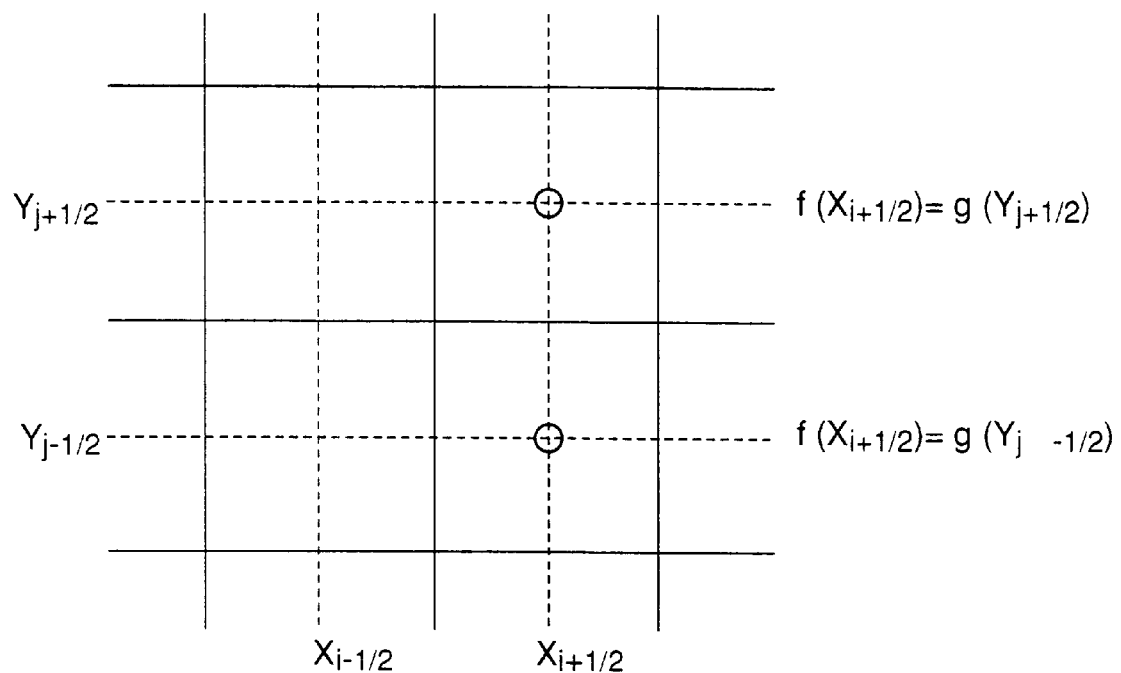
FIG. 6 is a diagram illustrating an example of redefinition at grid centers of physical quantities in the embodiment of the invention.

Regarding the difference with the position of definition, where the physical quantities are defined at the center of the grid, the physical quantities themselves, like coordinates, are directly used as f and g, but where they are defined on a grid point or on a grid face, physical quantities redefined at the grid center by linear interpolation with coordinates, as shown in FIG. 6, are used as f and g.

As regards the difference with the type of physical quantity, where the quantity is a vector quantity such as flow velocity, f and g values are set for each component, but where it is a scalar quantity such as pressure, the same values are used for f and g.

The grid spacing calculation step 22 of the optimal grid generating means 20 and the grid spacing calculation step 32 of the grid optimizing means 30 involve the following procedures.

A new grid spacing is calculated for each axial direction by the following set of Equations 2 from the inclination rates obtained by Equations 1 to adjust the grid spacing so as to decrease with an increase in variation rate with respect to the region above a pre-designated variation rate.
Equations 2

$$\Delta x'_i = \Delta x_i / (A \cdot a_i); \quad i = 1 \rightarrow n$$

$$\Delta x_i = x_{i+1/2} - x_{1-1/2} \quad A = \sum_{i=1}^{n}(1/a_i)$$

$$\Delta y'_j = \Delta y_j / (B \cdot b_j); \quad j = 1 \rightarrow m$$

$$\Delta y_j = y_{j+1/2} - y_{j-1/2} \quad B = \sum_{j=1}^{m}(1/b_j)$$

Here $\Delta x_i'$ denotes the adjusted grid spacing in the direction of the x axis; $a_i$ and $b_j$ both coefficients calculated by Equations 1; n, the total number of grid points in the direction of the x axis; $\Delta y_j'$, the adjusted grid spacing in the direction of the y axis; and m, the total number of grid points in the direction of the y axis.

In the processing by the optimal grid generating means 20, the aspect ratio R is further calculated by the following Equation 3 in the grid spacing adjustment step 23.
Equation 3

$$R = \Delta x_i' / \Delta y_j'$$

If R far deviates from 1, new grid points are set.

Thus, where R is far greater than 1, new grid points are set so as to let $\Delta x_k = \Delta x_i'/k$ (k is an integer equal to R deprived of its decimal fraction) hold in the x direction within the range of $\Delta x_i'$.

Or where R is far smaller than 1, new grid points are set so as to let $\Delta y_j = \Delta y_j'/l$ (l is an integer equal to 1/R deprived of its decimal fraction) hold in the y direction within the range of $\Delta y_j'$.

The present invention is characterized by its feature to generate initial grids and automatically optimize the grids during the execution of simulation in the following processing procedures.

The foregoing processing can be summarized as stated below with respect to each processing step by the optimal grid generating means 20 or the grid optimizing means 30.

At the inclination rate calculation step 21, in accordance with Equations 1, the variation rate in each direction of the outline of the obstacle is calculated by using the coordinates of the points where grid lines in the different axial directions cross coordinate axes and of the points where the grid lines cross the outline of the obstacle.

At the grid spacing calculation step 22, in accordance with Equations 2, grid spacings are calculated by using the values calculated at the inclination rate calculation step 21.

At the grid spacing adjustment step 23, an aspect ratio is calculated for each grid, and grid spacings are re-calculated in accordance with Equation 3.

At the physical quantity variation rate calculation step 31, in accordance with Equations 1, the spatial variation rate in each axial direction is calculated by using the calculated physical quantities.

At the grid spacing calculation step 32, in according with Equations 2, grid spacings are calculated by using the values calculated at the physical quantity variation rate calculation step 31.

Figure 7:
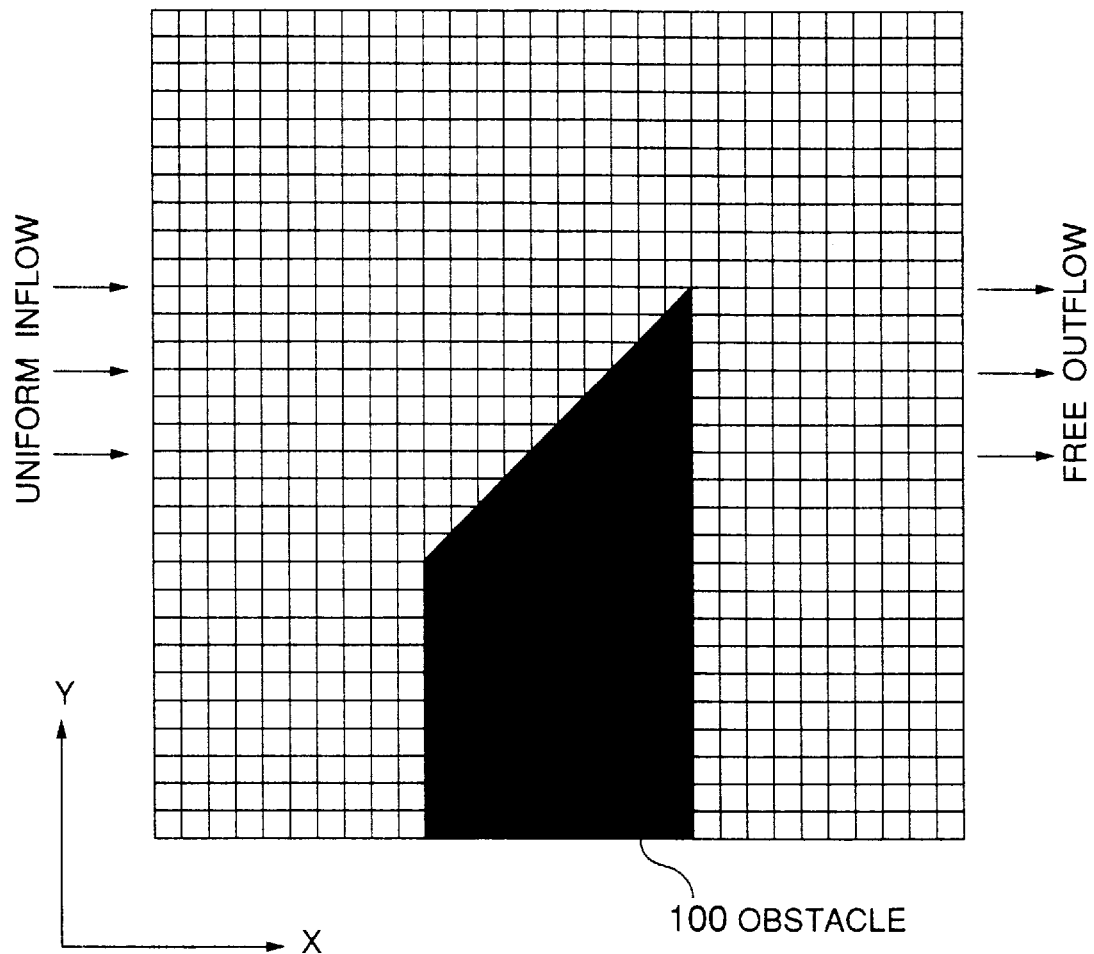
FIG. 7 is a diagram illustrating an initial grid in an example of application of the invention.

An example of actual application of these procedures will be given below. FIG. 7 illustrates an instance in which initial grids are generated in accordance with the present invention in the presence of a quadrilateral obstacle 100, one of whose edge lines is inclined, in a two-dimensional region to be analyzed. In this instance, it is supposed that one obstacle exists in a region to be analyzed where grids are formed, and air flows from left to right in the diagram. Incidentally, explanation of the setting of various conditions of simulation is dispensed with here because they are not directly relevant to the invention.

The optimal grid generating means 20, which generates optimal grids before the execution of simulation, first determines intersections between grid lines and edge lines of the quadrilateral obstacle 100, and then calculates the inclination rate of each edge line from the coordinates of these intersections (inclination rate calculation step 21).

Next, new grid spacings are calculated by Equations 2 from the inclination rates calculated by Equations 1, and grid points are re-disposed on that basis (grid spacing calculation step 22).

Figure 8:
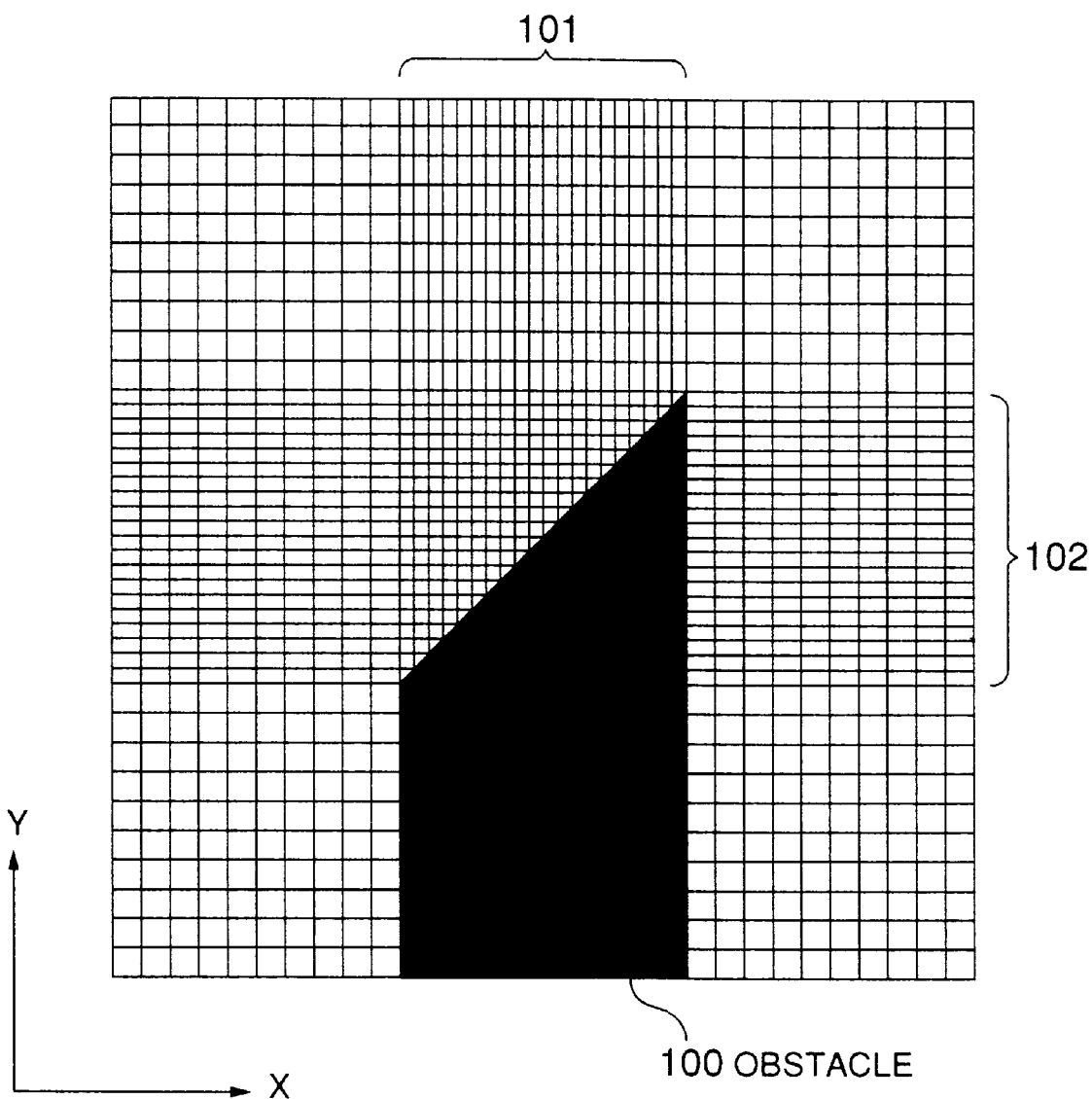
FIG. 8 is a diagram illustrating a grid re-disposed by the optimal grid generating means 20 in the example of application of the invention.

In this embodiment, as illustrated in FIG. 8, the number of grid points increases in ranges 101 and 102 wherein there is an edge line more inclined than a prespecified rate.

Furthermore, aspect ratios are calculated for all the grids, and the grid spacings are readjusted in accordance with Equation 3 (grid spacing adjustment step 23).

The foregoing sequence of processing steps results in the generation of finite difference grids for use in simulation.

Figure 9:
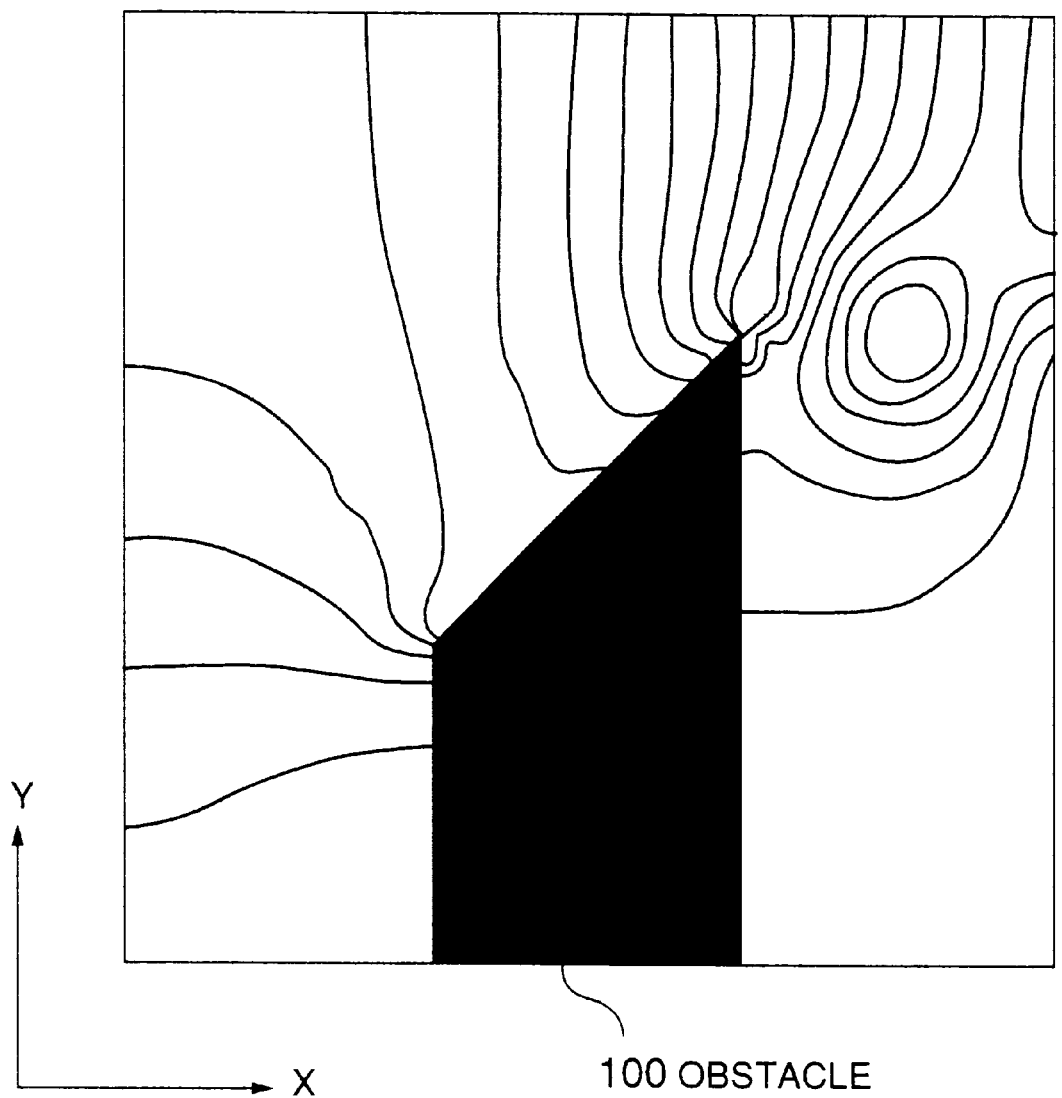
FIG. 9 is a diagram illustrating the spatial distribution of pressure in the example of application of the invention.

Next, during the execution of simulation, the grid optimizing means 30 for optimization of grids takes note of the spatial distribution of one physical quantity (isogram diagram of, in this embodiment, pressure) as shown in FIG. 9, and calculates its variation rate in accordance with Equations 1 (physical quantity variation rate calculation step 31).

Figure 10:
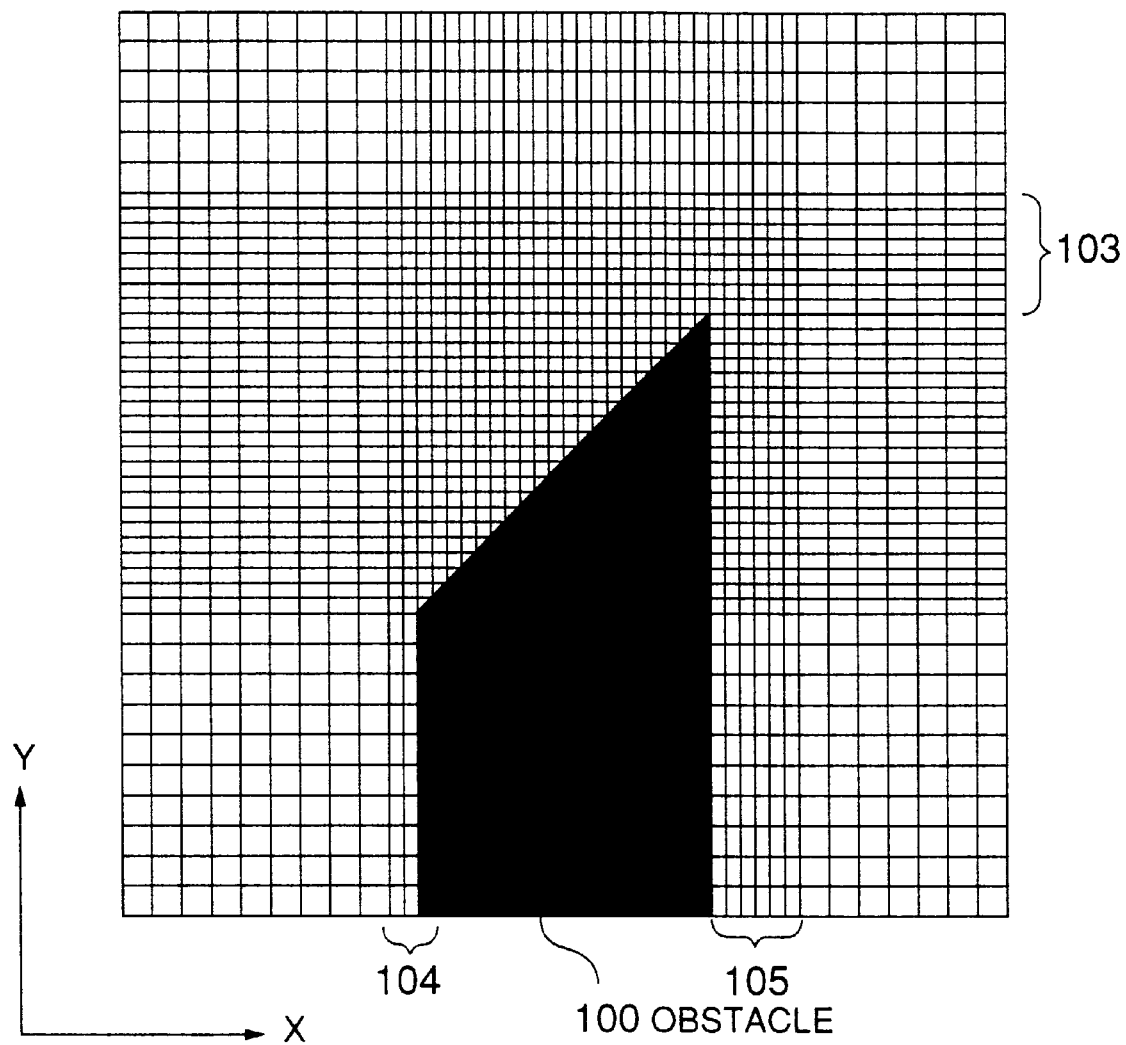
FIG. 10 is a diagram illustrating a grid re-disposed by the grid optimizing means 30 in the example of application of the invention.

Finally, in accordance with Equations 2, grid spacings are calculated from the variation rates obtained at the physical quantity variation rate calculation step 31, and the grid points are thereby re-disposed (grid spacing calculation step 32). In this embodiment, as shown in FIG. 10, the number of grid points increases in regions where the pressure varies more than the prespecified variation rate, i.e. ranges 103, 104 and 105 where the isograms of pressure are particularly dense.

These physical quantity variation rate calculation step 31 and grid spacing calculation step 32 are repeated, in steady-state simulation, until grid point coordinates no longer vary from before to after re-disposition. On the other hand, in transient simulation, the physical quantity variation rate calculation step 31 and the grid spacing calculation step 32 are repeated until a prespecified number of repeats is reached. In this way, even during the execution of simulation, optimization of grids is automatically executed from time to time, resulting in highly accurate solutions.

Another preferred embodiment of the present invention, as illustrated in FIG. 1, is a computer-readable recording medium 40 in which is recorded a program to cause the optimal grid generating means 20 and/or the grid optimizing means 30 to execute optimization of finite difference grids similarly to what the foregoing embodiment does. This recording medium 40 may be either a magnetic disk, a semiconductor memory or some other recording medium.

Although the invention has been described with reference to preferred embodiments thereof, it may be evident to those skilled in the art that the invention is not necessarily limited to the foregoing embodiments.

As hitherto stated, the method for automatic optimization of finite difference grids for use in a simulator according to the invention makes possible automatic adjustment of grid spacings in the generation of initial grids to provide solutions more precisely from the initial stage than any conventional method can and, moreover, dispenses with the setting of specific parameters as in a solution adaptive grid method thereby to reduce the time required for optimizing calculation.

Furthermore, the invention makes possible automatic adjustment of grid spacings even during simulation, resulting in an even higher level of accuracy for the solutions that are obtained.

Moreover, since grid spacings can be adjusted to some extent in the generation of initial grids, the loads of man-hours and cost required for adjusting during simulation are reduced to eliminate the need to repeat simulation and prevent the time essentially required for simulation from increasing unnecessarily.

What is claimed is:

1. A method for automatic optimization of finite difference grids for use in a CFD simulator for a simulation model based on a Cartesian coordinate system comprising the steps of;

calculating, for each grid point, the variation rate of a first prescribed function at the x coordinate value thereof and the variation rate of a second prescribed function at the y coordinate value thereof;

calculating new grid spacings by using said calculated variation rate of said first prescribed function for grid spacings in the direction of the x axis at each grid point and by using said calculated variation rate of said second prescribed function for grid spacings in the direction of the y axis at each grid point in such a manner that the greater the variation rate the narrower the grid spacing; and wherein said new grid spacings are used by said CFD simulator to optimize the spacings of the initial grids.

2. A method for automatic optimization of finite difference grids, as claimed in claim 1, wherein:

as said first prescribed function, there is set a first function whose value is the y coordinate value of the intersection between a grid line, parallel to the y axis, passing said grid point and the surface of the shape to be analyzed of the simulation model;

as said second prescribed function, there is set a second function whose value is the x coordinate value of the intersection between a grid line, parallel to the x axis, passing said grid point and the surface of the shape to be analyzed of the simulation model; and new grid spacings are calculated before the execution of simulation by using the variation rates of said first and second functions.

3. A method for automatic optimization of finite difference grids, as claimed in claim 2, further comprising the steps of:

calculating an aspect ratio with respect to each of the grid spacings calculated by using the variation rates of said first and second functions, and calculating new grid spacings, where said calculated aspect ratios far deviate from 1, by dividing the grid spacings in the direction of the x axis or the y axis by a prescribed integer so that the aspect ratios approach 1.

4. A method for automatic optimization of finite difference grids, as claimed in claim 3, wherein:

as said first prescribed function, there is further set a third function whose value is the component of the physical quantity in the direction of the x axis at each of said grid points, as said second prescribed function, there is further set a fourth function whose value is the component of the physical quantity in the direction of the y axis at each of said grid points, and new grid spacings are calculated during simulation by using the variation rates of said third and fourth functions.

5. A computer-readable recording medium comprising:

a computer-readable data storage device, and a program on said device for automatic optimization of finite difference grids for use in a CFD simulator for a simulation model based on a Cartesian coordinate system, said program causing a computer to calculate, for each grid point, the variation rate of a first prescribed function at the x coordinate value thereof and the variation rate of a second prescribed function at the y coordinate value thereof;

to calculate new grid spacings by using said calculated variation rate of said first prescribed function for grid spacings in the direction of the x axis at each grid point and by using said calculated variation rate of said second prescribed function for grid spacings in the direction of the y axis at each grid point in such a manner that the greater the variation rate the narrower the grid spacing; and wherein said new grid spacings are used by said CFD simulator to optimize the spacings of the initial grids.

6. A computer-readable recording medium, as claimed in claim 5, wherein:

as said first prescribed function, there is set a first function whose value is the y coordinate value of the intersection between a grid line, parallel to the y axis, passing said grid point and the surface of the shape to be analyzed of the simulation model;

as said second prescribed function, there is set a second function whose value is the x coordinate value of the intersection between a grid line, parallel to the x axis, passing said grid point and the surface of the shape to be analyzed of the simulation model; and new grid spacings are calculated before the execution of simulation by using the variation rates of said first and second functions.

7. A computer-readable recording medium, as claimed in claim 6, wherein said program further causes the computer:

to calculate an aspect ratio with respect to each of the grid spacings calculated by using the variation rates of said first and second functions, and to calculate new grid spacings, where said calculated aspect ratios far deviate from 1, by dividing the grid spacings in the direction of the x axis or the y axis by a prescribed integer so that the aspect ratios approach 1.

8. A computer-readable recording medium, as claimed in claim 7, wherein:

as said first prescribed function, there is further set a third function whose value is the component of the physical quantity in the direction of the x axis at each of said grid points, as said second prescribed function, there is further set a fourth function whose value is the component of the physical quantity in the direction of the y axis at each of said grid points, and new grid spacings are calculated during simulation by using the variation rates of said third and fourth functions.

* * * * *